(12) United States Patent
Bottomley et al.

(10) Patent No.: US 7,308,019 B2
(45) Date of Patent: Dec. 11, 2007

(54) SYSTEM AND METHOD FOR FAST WALSH TRANSFORM PROCESSING IN A MULTI-CODED SIGNAL ENVIRONMENT

(75) Inventors: Gregory E. Bottomley, Cary, NC (US); Ali S. Khayrallah, Apex, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 900 days.

(21) Appl. No.: 10/151,682

(22) Filed: May 20, 2002

(65) Prior Publication Data

US 2003/0215003 A1 Nov. 20, 2003

(51) Int. Cl.
    H04L 27/30 (2006.01)
(52) U.S. Cl. .................. 375/142; 375/343; 375/349; 370/209; 370/320; 370/335; 370/479
(58) Field of Classification Search ............... 375/141, 375/142, 144, 148, 260, 267, 343, 349; 370/209, 370/320, 335, 342, 441, 465, 479
    See application file for complete search history.

(56) References Cited

U.S. PATENT DOCUMENTS

| 5,357,454 | A | 10/1994 | Dent |
| 5,506,861 | A | 4/1996 | Bottomley |
| 6,005,887 | A | 12/1999 | Bottomley et al. |
| 6,259,721 | B1 * | 7/2001 | Uesugi et al. ............... 375/130 |
| 6,771,688 | B1 * | 8/2004 | Lee et al. .................... 375/142 |
| 6,798,737 | B1 * | 9/2004 | Dabak et al. ............... 370/209 |
| 6,934,319 | B2 * | 8/2005 | Subramanian ............... 375/142 |
| 7,010,016 | B2 * | 3/2006 | Margulis et al. ............ 375/147 |

OTHER PUBLICATIONS

Madkour MF et al: "Multi-rate multi-code CDMA using FWT for mobile and personal communications" Personal, Indoor and Mobile Radio Communications, 1998. The Ninth IEEE International Symposium on Boston, MA, USA, Sep. 8-11, 1998, New York, NY, USA, IEEE, US, Sep. 8, 1998, pp. 779-783, XP010314514 ISBN: 0-7803-4872-9.

K.G. Beauchamp, Applications of Walsh and Related Functions, Academic Press, 1984, 10 pgs.

* cited by examiner

Primary Examiner—Dac V. Ha
(74) Attorney, Agent, or Firm—Coats & Bennett, P.L.L.C.

(57) ABSTRACT

A flexible Fast Walsh Transform circuit provides configurable FWT sizes, and is suitable for use in radio receivers where the received signal may be generated using varying spreading codes and/or varying numbers of multi-codes. Such signal types are commonly encountered in wireless communication systems like those based on the Wideband CDMA (W-CDMA) or IS-2000 (cdma2000) standards, and particularly with the higher data rate provisions of those standards. In one application, a RAKE receiver includes RAKE fingers that each include one of the flexible FWT circuits, such that each finger despreads the received signal using variably sized FWTs in accordance with the characteristics of the received signal. The flexibility in FWT sizing may derive from, for example, the inclusion of separately selectable but differently sized FWT circuits, or from the inclusion of a configurable FWT circuit capable of generating different sizes of FWTs.

28 Claims, 12 Drawing Sheets

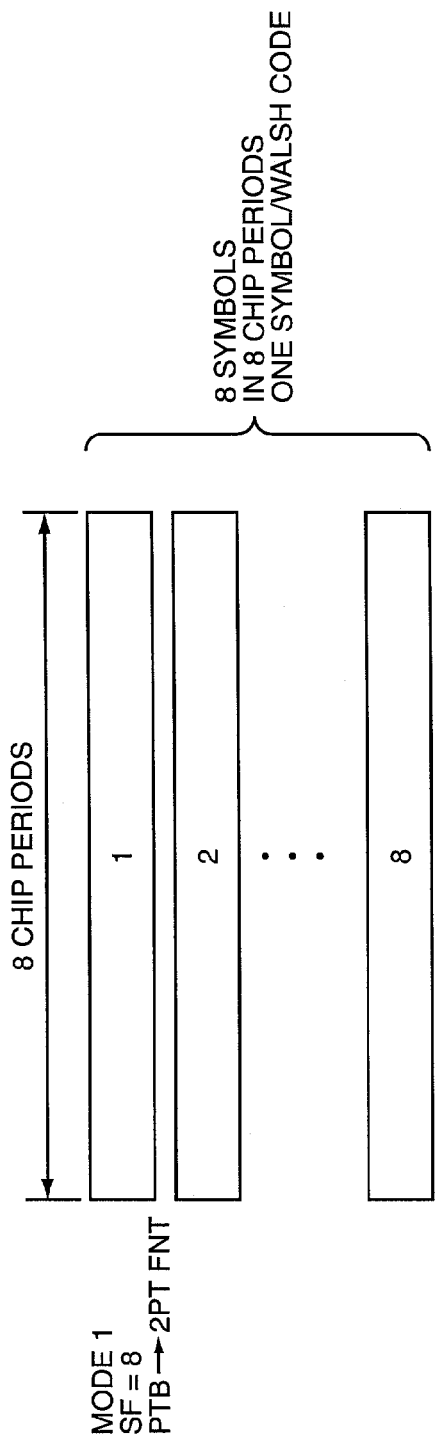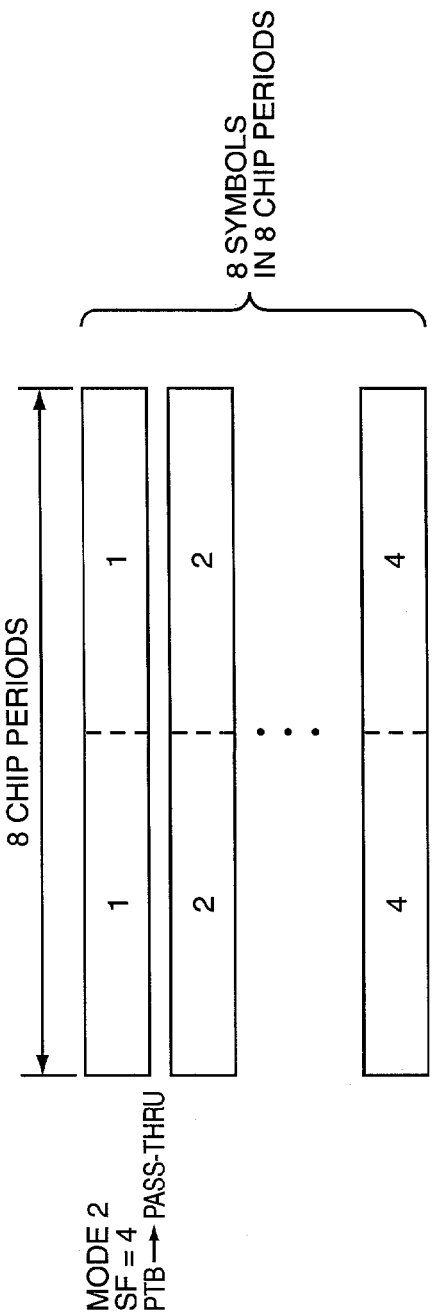

SYSTEM AND METHOD FOR FAST WALSH TRANSFORM PROCESSING IN A MULTI-CODED SIGNAL ENVIRONMENT

BACKGROUND OF THE INVENTION

The present invention generally applies to signal processing, and particularly applies to processing received signals using Fast Walsh Transforms.

Newer wireless communication standards, such as the evolving Wideband Code Division Multiple Access (W-CDMA) standards, incorporate increasingly sophisticated signal encoding and modulation schemes in efforts to increase bandwidth efficiency and transmission data rates. These advances enable users of the newer wireless networks (e.g., third-generation) to receive and transmit relatively high-rate data streams representing a variety of information types, including voice, data, and video.

Efficient spectral use requires these newer wireless networks to adopt variable data rates where, in essence, users are assigned the minimum data rates necessary to support their respective communication needs. For example, a user receiving a multimedia presentation from the Web is allocated more bandwidth and/or a more complex signal-encoding scheme than a user engaged in a simple voice call.

Various approaches, such as those adopted by the W-CDMA standards, employ orthogonal variable spreading factor (OVSF) codes to achieve variable data rate transmissions. In such schemes, one of a set of orthogonal spreading factor codes is used to spread user data. Such spreading factors might range from 4 to 256, for example. In W-CDMA, the chip rate is 3.84 Mchips/s, and the data rate (pre-spreading) equals the chip rate divided by the chosen spreading factor (SF). Therefore, user data rates are varied by appropriate selection of spreading factors.

Additional data rate variability derives from the use of multiple code assignments per user, referred to as multi-code spreading. For example, in W-CDMA a user might be assigned multiple channels to increase the aggregate data rate to that user. One approach to such multi-code spreading involves the use of different channelization codes per assigned channel (e.g., different OVSF codes per channel). In this manner, multiple dedicated physical data and/or control channels (DPDCH, DPCCH) can be assigned to each user to increase the maximum data rate to that user.

While such capability is good from the perspective of enhanced performance, receiver complexity necessarily increases with the variable spreading factors and multi-code transmissions. Indeed, the use of multi-code transmissions requires wireless communication receivers in such systems to accommodate multi-code received signals that require essentially separate despreading operations for each multi-code component of the received signal. Such variability in the received signal places demands on the receiver in terms of adapting its signal processing to the changing signal parameters.

BRIEF SUMMARY OF THE INVENTION

The present invention includes a method and apparatus for adapting a wireless communication receiver's Fast Walsh Transform (FWT) despreading operations in accordance with changing received signal parameters. More particularly, at least some exemplary embodiments of the present invention comprise FWT processing that allows the size and/or number of FWTs performed by the despreading circuit(s) of a wireless communication receiver to be varied in accordance with, for example, the spreading factor applied to the received signal at its transmission. In a multi-coding transmission environment, the transmitter's spreading factor may be varied to effect variable user data rates. These techniques may be used in wireless communication networks based, for example, on either Wideband CDMA (W-CDMA) or IS-2000 (cdma2000) standards.

In an exemplary embodiment of the present invention, a "flexible" RAKE receiver includes one or more RAKE fingers that use despreading circuits based on configurable FWT processing to despread the received signal. Configurable FWT processing allows the RAKE receiver to adjust FWT operations to accommodate the particular characteristics of the current received signal. For example, the RAKE receiver may vary the "size" of the FWT performed by the FWT processing circuitry of each finger in dependence on the spreading factor of the received signal, e.g., the number of "chips" per symbol used in its transmission. This configuration flexibility allows the exemplary RAKE receiver to adjust its operations to varying numbers of multi-codes, and varying spreading factors.

In one embodiment, the wireless communication receiver includes control logic for configuring FWT resources, and each RAKE finger includes two or more selectively accessed FWT circuits, each offering differently sized FWTs. In operation, the fingers are controlled such that the appropriately sized FWT circuit is selected for received signal processing. In other embodiments, a combined FWT circuit that offers flexible FWT processing is used. The flexible FWT processor generates different sizes of FWTs responsive to control information, such as a selection control signal generated by the control logic, which may comprise both discrete and integrated logic and/or control software. In any case, the size of the FWT performed by each finger may be varied as needed to accommodate changing received signal characteristics. In general, where the spreading factor of the received signal is less than or equal to the maximum size of FWT that the flexible RAKE receiver is capable of performing, the receiver may generate one or more FWT results. For example, instead of despreading two symbol periods corresponding to one signal image, each flexible RAKE finger might despread the same symbol at different delays.

Various embodiments of the flexible FWT circuit include FWT circuits with intermediate-stage outputs, and FWT circuits with pass-through stages. In the intermediate-stage output approach, a FWT circuit includes not only its final stage outputs, but one or more intermediate stage outputs as well. For example, a sixteen-point FWT circuit might include its final set of sixteen sum-and-different outputs, but also includes two eight-point sum-and-difference intermediate stage outputs taken from different halves of its sum-and-difference butterfly circuits. This concept can be extended such that, for example, this same sixteen-point FWT circuit might offer up to four four-point FWT intermediate stage outputs. Thus, this one FWT circuit can be selectively configured to perform sixteen-, eight-, and four-point FWTs.

In another approach to the flexible FWT circuit, an n-point FWT circuit includes cascaded pass-through-butterflies (PTBs) that may be selectively controlled to offer either FWT or pass-through functionality. In at least one embodiment, each PTB performs either a pass-through operation where it simply passes through its input signal, or performs a two-point FWT on its input signal. Thus, essentially any desired size of FWT may be performed by selectively controlling one or more sets of cascaded PTBs.

With any of the above approaches, or any variations thereof, the flexible RAKE receiver offers configurable FWT processing, which enables it to dynamically adjust its despreading operations to match the particular characteristics of the received signal. Further, where a finger is configured to perform a maximum size m-point FWT, it generally also can perform two or more n-point FWTs (n<m), either sequentially or in parallel. This ability allows variations on the basic signal despreading operations. For example, with the flexible FWT processing of the present invention, the RAKE receiver can perform partial despreading, which allows it to perform partial correlations over different regions of the received signal. For example, partial correlations may be performed using samples corresponding to part of a symbol times of the received signal. Exemplary uses of partial correlation operations are shown, for example, in U.S. Pat. No. 5,506,861 to Bottomley.

BRIEF DESCRIPTION OF THE DRAWINGS

FIGS. 4A and 4B are diagrams of symbol transmission formats for different spreading factors.

FIG. 13A is a diagram of another exemplary embodiment for the flexible RAKE receiver of FIG. 1, while

DETAILED DESCRIPTION OF THE INVENTION

Figure 1:
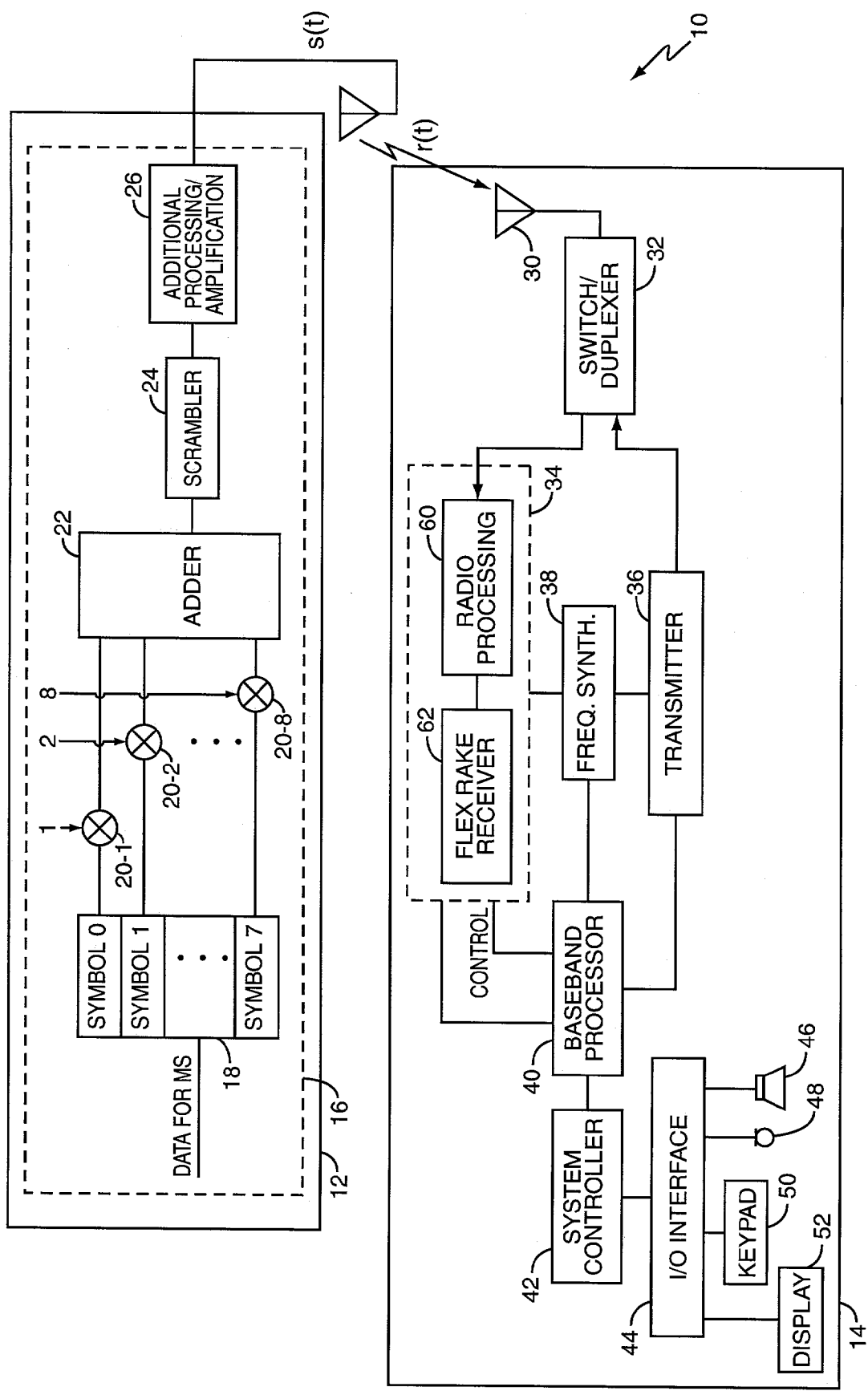
FIG. 1 is a diagram of an exemplary wireless communication network including a transmitting base station and a receiving mobile station, wherein the mobile station includes an exemplary receiver having flexible FWT capabilities in accordance with the present invention.

FIG. 1 is a diagram of an exemplary wireless communication network generally referred to by the numeral 10. In this simplified illustration, a radio base station (RBS) 12 communicates with a mobile station 14 via wireless signaling. While just one mobile station 14 and RBS 12 are shown for brevity, it should be understood that practical wireless communication systems (networks) generally have many RBSs 12 serving a large plurality of mobile stations 14.

Additionally, practical wireless networks include other entities (not shown), such as base station controllers (BSCs), mobile switching centers (MSCs), packet control functions (PCFs), and packet data serving nodes (PDSNs), to carry communication traffic between mobile stations 12 and various other networks, such as the Public Switched Telephone Network (PSTN) and the Internet.

RBS 12 processes information intended for the mobile station 14 and uses transmit signal s(t) to convey that information to the mobile station 14. Distortions of signal s(t) arise during its transmission through the physical medium, and it is thus received as signal r(t) at the mobile station 14. Depending on the characteristics of the radio channel between RBS 12 and mobile station 14, r(t) may actually comprise two or more versions of the transmitted signal s(t), with each version having different delay, phase, and attenuation characteristics. This form of signal distortion is referred to as "multipath" reception, and is well understood by those skilled in the art.

The particular characteristics of the transmitted signal s(t) depend on the selected communication protocols and attendant modulation standards. That is, the specific encoding and modulation used to form the transmit signal s(t) for conveying the desired information to the mobile station 14 depends on air interface standard adopted by the network 10, and often further depends on the current data rate assigned to the mobile station 14. Exemplary air interface standards include Wideband-CDMA (W-CDMA) and IS-2000 (cdma2000), each of which defines selected encoding and modulation schemes, and make provisions for multi-coding of signals.

With multi-coding, two or more spreading codes are applied to the information intended for the mobile station 14. In this simplified functional depiction of the RBS 12, a transmitter 16 processes the information to be sent to the mobile station 14. This simplified transmitter 16 comprises a serial-to-parallel (S/P) converter 18, Walsh spreaders 20 (e.g., 20-1 through 20-8), an adder 22, a scrambler 24, and additional processing and amplification circuitry 26. In general, a transmission system may employ multiple stages of spreading but the focus here is on the stage that performs Walsh code-based spreading.

Information intended for the mobile station 14 enters S/P converter 18, where it is converted into a parallel set of symbols, here, a parallel set of eight symbols. Each symbol is spread using a separate Walsh code. Those skilled in the art will appreciate that many different multi-coding schemes may be used, with varying code sets and varying numbers of codes being applied to the information signal. In any case, the adder 22 converts the multi-coded word back into a single signal for input to the common scrambler 24. The scrambled signal then passes to the additional processing and amplification circuitry 26 where, among other things, it is used to modulate a radio frequency carrier signal of the desired frequency. This modulated carrier signal is then transmitted as s(t) by the RBS 12.

In turn, r(t) is received by the mobile station 14, which, in this exemplary configuration, comprises an antenna 30, a switch/duplexer 32, a receiver 34, a transmitter 36, a frequency synthesizer 38, a baseband processor 40, a system processor or controller 42, input/output (I/O) interface circuits 44, a speaker 46, a microphone 48, a keypad 50, and a display 52. Much of the operation of mobile station 14 is well understood by those skilled in the art, and is, in any case, not germane to understanding the present invention in its various embodiments. Consequently, the following discussion omits operational details relating to the mobile station 14, where such details do not further understanding of the present invention.

In particular, the discussion focuses on operation of the receiver 34, which may be organized as a flexible RAKE receiver in accordance with at least some embodiments of the present invention. Further, the discussion includes exemplary details regarding the supporting operations of the baseband processor 40 and the system controller 42.

In operation, the mobile station 14 receives the signal r(t) from the RBS 12, which signal is directed into the receiver 34 via the switch 32. Receiver 34 comprises, in this exemplary embodiment, a radio processor 60 and a flexible RAKE receiver 62. The radio processor typically includes receive signal filtering, amplification, and analog-to-digital conversion, although the specific implementation may be varied in accordance with specific design needs. Generally, the radio processor 60 down-converts the received signal r(t), possibly using reference frequencies provided by the frequency synthesizer 38.

Radio processor 60 outputs a digitized sample stream or streams, such as In-phase (I) and quadrature (Q) sample streams at an intermediate or baseband frequency representing received radio signal r(t). This digitized sample stream is referred to as the received signal r'. Thus, the flexible RAKE receiver 62 takes as its received signal input the digitized sample stream r' corresponding to the received signal r(t).

Figure 2:
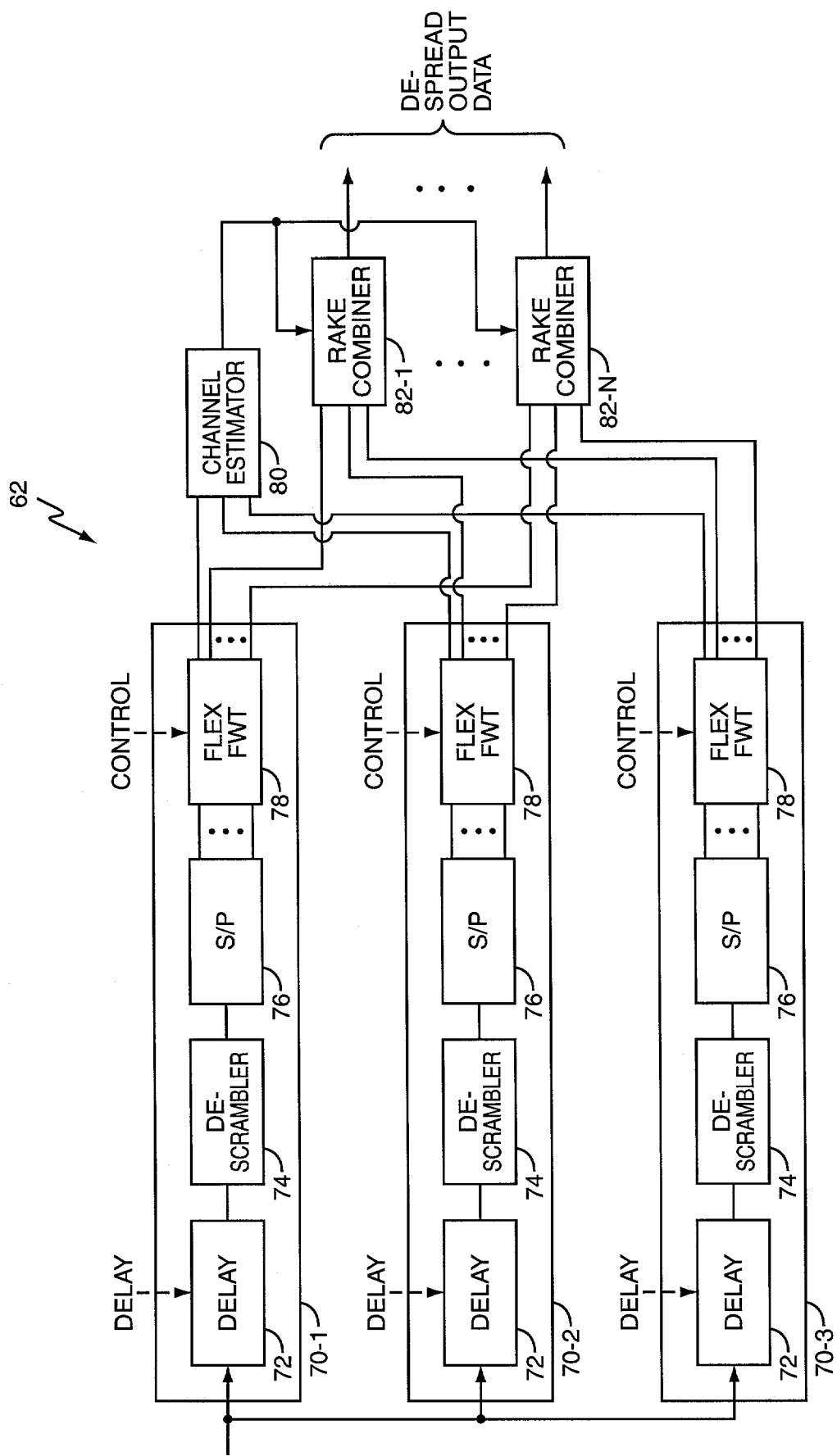
FIG. 2 is a diagram of exemplary details for the flexible RAKE receiver in the mobile station of FIG. 1.

FIG. 2 illustrates exemplary details for one embodiment of the flexible RAKE receiver 62. Here, the RAKE receiver 62 comprises one or more RAKE fingers, shown here as fingers 70-1, 70-2, and 70-3. Each finger 70 comprises a delay block 72, a descrambler 74, a S/P 76, and a flexible FWT circuit 78. The overall RAKE receiver 62 further comprises a channel estimator 80, and one or more RAKE combiners 82-1 through 82-N. The RAKE combiners 82 output despread data associated with the information received in r', while the channel estimator 80 provides channel compensation parameters, e.g., phase and amplitude information, used by the RAKE combiners 82 when combining the corresponding outputs from each of the RAKE fingers 70.

Each RAKE finger 70 is aligned with a different ray or multipath delay component in the received signal r', which, as noted before, arise from multipath reception of r(t). Those skilled in the art will appreciate that time aligning each RAKE finger 70 with a particular delay component of the received signal r(t) may be effected by adjusting pseudo random noise (PN) code offsets used in correlation, or by including an adjustable delay function on the front-end of each RAKE finger 70. Here, the latter approach is used, and each delay block 72 is adjusted to the time delay or relative time offset of a corresponding delay component in the received signal r'.

Figure 3A:
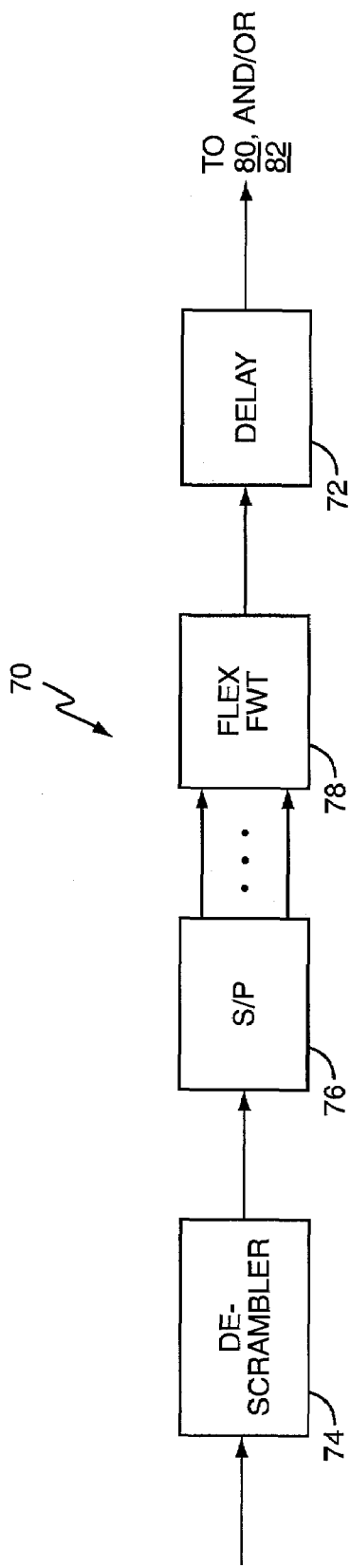
FIGS. 3A and 3B are diagrams illustrating variations on the signal processing path of the RAKE receiver fingers shown in FIG. 2.
Figure 3B:
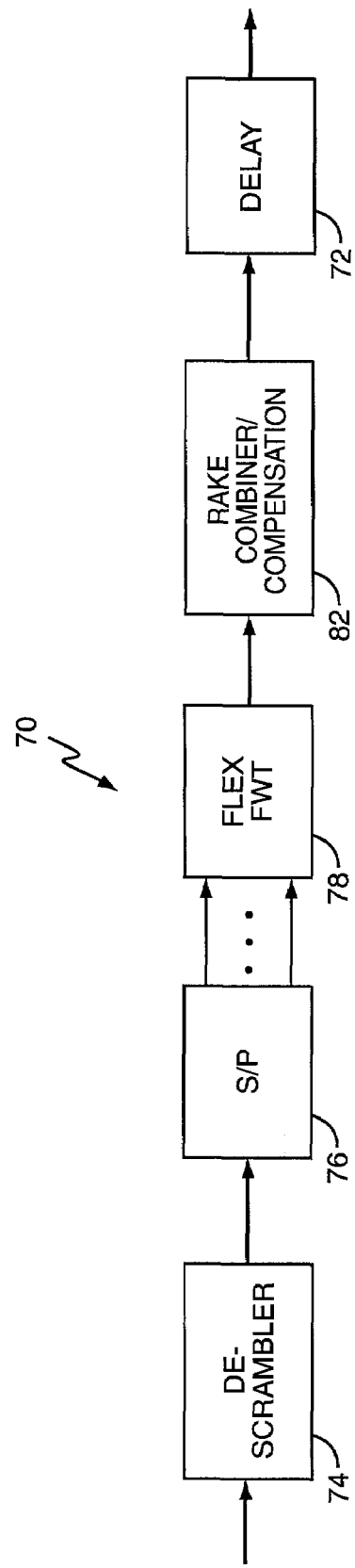

As examples of the many variations available for implementation of the RAKE fingers 70 within the RAKE receiver 62, FIGS. 3A and 3B illustrate different orderings of the basic operations of descrambling and despreading, with consequent variations on the combining and compensating steps. For example, FIG. 3A illustrates despreading (correlating) before application of the path delay via delay block 72. That is, the flexible FWT circuit 78 correlates the received signal r' in advance of delay block 72.

Similarly, but with slightly different operational order, FIG. 3B illustrates a RAKE finger variation wherein channel compensation, which might be performed using an equivalent compensation function to that performed by RAKE combiners 82, is applied to the despread output from the flexible RAKE circuit 70 before feeding the signal into the delay block 72. Of course, the point here is not to exhaustively step through all the possibilities for ordering RAKE receiver operations, rather the point is to illustrate that advantages stemming from use of the flexible FWT circuit 78 are essentially independent of the particular organization of the RAKE receiver 62.

In any case, referring again to FIG. 2, the transmit signal s(t) is normally subjected to a common scrambling operation in its formation, and, as such, the exemplary RAKE fingers 70 each include a descrambler 74 that outputs a descrambled serial sample stream. The descrambled serial sample stream serves as the input to S/P 76, which provides the flexible FWT circuit 78 with parallel sets of input samples corresponding to the serial sample stream from the associated S/P 76.

In looking back to transmit signal generation, one sees that parallel information symbols multiply separate Walsh codes, which are then added chip-by-chip for efficient radio transmission. On the receiver side, the signal r' is processed to recover the corresponding parallel information symbols using the flexible FWT circuit 78. Thus, in general operation, the flexible FWT circuit 78 in each finger 70 receives descrambled samples representing the desired transmit information.

FIGS. 4A and 4B together illustrate two of the many possible spreading factor variations that result in the need for different FWT operations at the RAKE receiver 62. In FIG. 4A, referred to as "Mode 1," the received signal r(t) was transmitted with a, spreading factor (SF) of eight, and encoded using eight Walsh codes. Thus, eight information symbols are received over eight chip periods. With these signal parameters, each finger 70 in the RAKE receiver 62 of FIG. 2 configures its flexible FWT circuit 78 for an eight-point FWT operation. That is, each finger 70 performs a separate eight-point FWT on each multipath component of r'.

In FIG. 4B, referred to as "Mode 2," the same eight symbols are transmitted over the same eight chip periods, but using a spreading factor (SF) of four, i.e., four chips per symbol. This change in spreading factor causes the eight symbols to be received as two sets of four symbols, where the different sets of symbols must be despread using two four-point FWTs. Thus, in this second mode of reception, each RAKE finger 70 configures its flexible FWT circuit 78 to perform two four-point FWTs on the received signal, to recover the two sets of symbols. That is, the FWT resources in each finger 70 are reconfigured to perform separate four-point FWTs on the first and second halves of the eight samples from the associated S/P 76.

Figure 5:
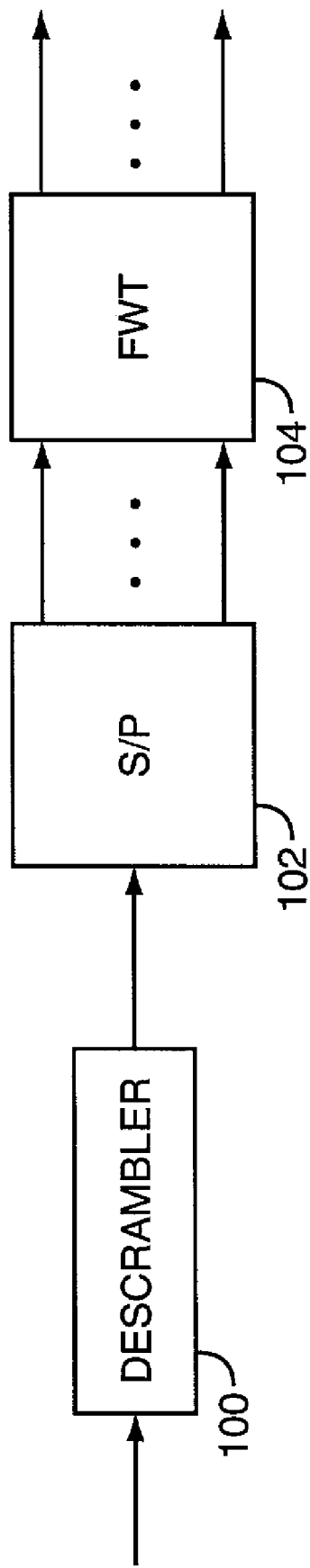
FIG. 5 is a diagram of a conventional FWT circuit, along with some of its supporting circuitry.

In practical applications, mobile stations may be expected to deal with a potentially large mix of spreading factors and multi-code encoding schemes. Such variations make the flexible FWT processing provided by the present invention particularly advantageous. Conversely, existing FWT processing uses a single FWT. FIG. 5 illustrates this conventional approach, wherein a radio receiver (not shown) includes a descrambler 100 that receives a digitized sample stream, a S/P converter 102, and a fixed-sized FWT circuit 104. The fixed-size of the conventional FWT circuit 104 limits the flexibility of the conventional receiver as regards its ability to receive and process signals using varying numbers of spreading codes and spreading factors.

Figure 6:
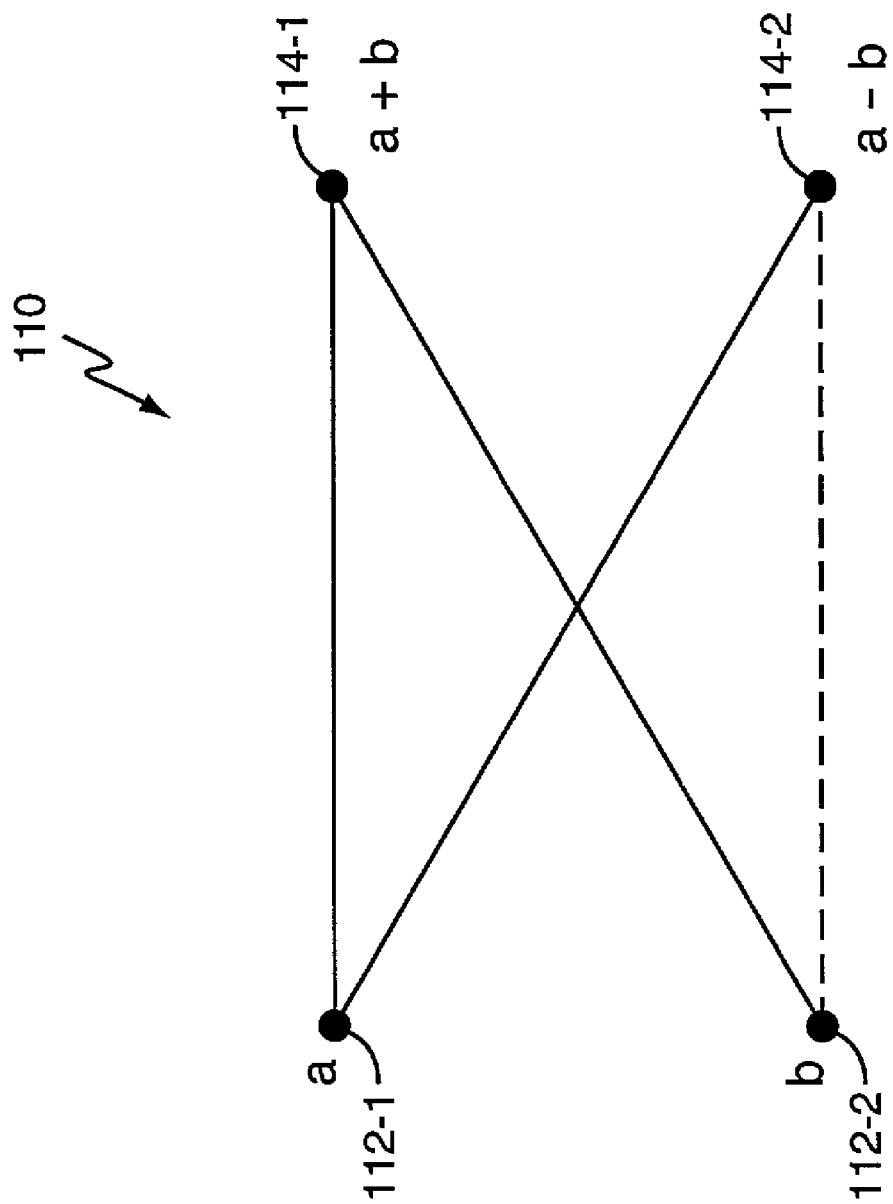
FIG. 6 is a diagram of a convention sum-and-difference butterfly circuit as might be used in implementing a two-point FWT.

However, some understanding of the basic FWT operation, even in the context of a conventional FWT circuit may be helpful in discussing exemplary details of the flexible FWT circuit 78. Thus, FIG. 6 shows the operation of a FWT butterfly circuit 110. Two inputs, 112-1 and 112-2, receive input samples "a" and "b" in a digitized sample stream applied to the butterfly circuit 110. Circuit 110 performs sum and difference operations on the two inputs, and provides the results on its outputs 114-1 and 114-2. That is, the FWT circuit provides sum-and-difference output results as (a+b) and (a−b).

In more detail, assume the input signal comprises an eight-sample vector {a, b, c, d, e, f, g, h}. A FWT of this input vector amounts to performing butterfly operations on different pairs of samples within the input vector. These butterfly operations process each set of paired samples to produce sum or difference results. For example, the set of butterfly operations forms a first set of sum-and-difference results as, (a+b), (a−b), (c+d), (c−d), (e+f), (e−f), (g+h), (g−h). Note that successive pairings, such as (a+b) with (c+d), form successive sets of sum-and-difference results that are used in forming the final FWT output.

Figure 7:
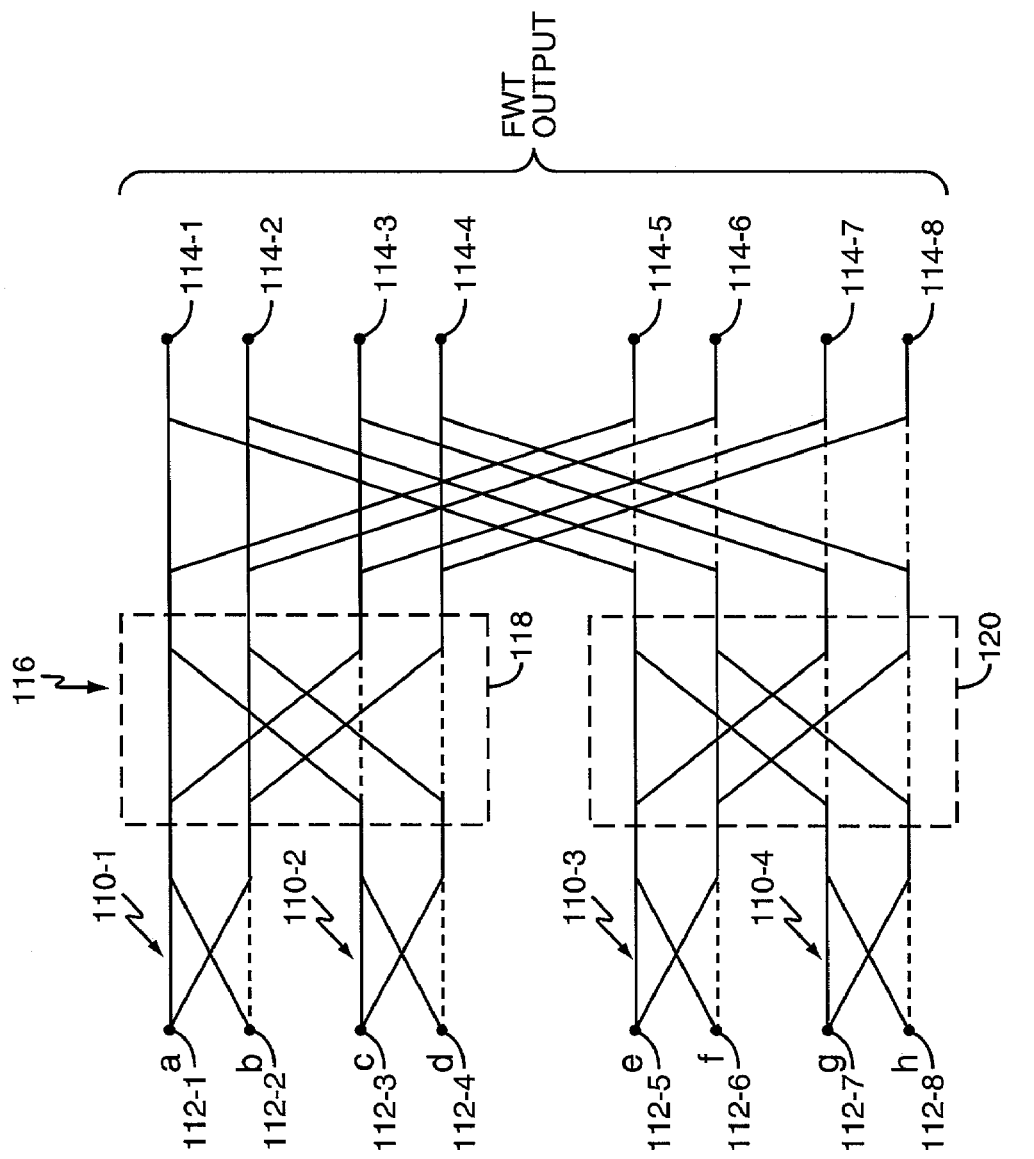
FIG. 7 is a diagram of a conventional eight-point FWT circuit configured for eight-point FWTs.

FIG. 7 illustrates a conventional FWT circuit 116 configured for an eight-sample input vector. Samples "a" through "h" are presented to a set of inputs 112, a first set of butterfly circuits 110 perform the initial set of sum-and-difference results from these applied samples. A second set 118 of butterfly circuits form a successive set of sum-and-difference results using sum-and-difference pairs formed from the first four samples of the input signal, with a third set 120 of butterfly circuits doing likewise for the sum-and-difference pairs formed from the last four samples of the input signal. It should be understood that the sets of butterfly circuits 110, 118, and 120 all operate in like manner, with the different reference numbers being used for clarity. Note that the intermediate results from butterfly circuits 118 and 120 cross-feed into the final outputs 114-1 through 114-8 in a defined pairing scheme to form the final set of sum-and-difference results representing the desired FWT.

The final set of results output by the FWT circuit 116 represents an eight-point FWT of the input vector. Thus, the FWT circuit 116 might be useful in despreading a received signal containing up to eight Walsh codes, each of length 8. However, its usefulness quickly diminishes where the encoding and spreading details of the received signal vary such that eight-point FWT operations are appropriate only at selected times. Such variations in the received signal are, as described earlier, commonly encountered in wireless communication systems, particularly where users are assigned varying data rates that correspond to varying encoding and spreading schemes.

The RAKE receiver 62 shown in FIG. 2, for example, accommodates variable encoding and spreading schemes by providing selectable sizes of FWTs. For example, each finger 70 of the flexible RAKE 62 might offer a selectable size of FWT, e.g., four-point, eight-point, or sixteen-point FWTs. Further, in some configurations, the fingers 70 might process the received signal using multiple FWTs of the same or different sizes. For example, the fingers 70 might each apply two or more four-point or eight-point FWTs to the received signal in partial correlation operations.

Figure 8A:
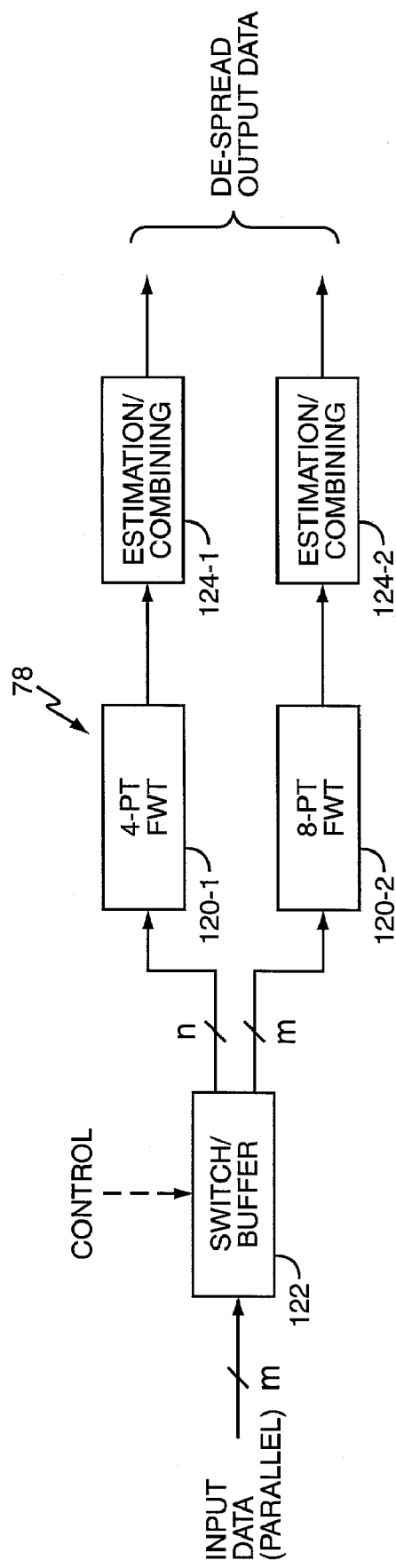
FIGS. 8A and 8B are diagrams of exemplary embodiments of baseband processing including a flexible FWT circuit in accordance with the present invention.

FIG. 8A illustrates one approach to implementing the flexible RAKE receiver 62 such that it offers selectable FWT sizes. In this embodiment, the flexible FWT circuit 78 shown, for example, in each RAKE finger 70 of FIG. 2, comprises a number of separate FWT circuits 120, shown here as two transform circuits 120-1 and 120-2. Each transform circuit 120 performs a different size of FWT, e.g., transform circuit 120-1 performs a four-point FWT while transform circuit 120-2 performs an eight-point FWT. One or both transform circuits 120 might be selected depending on the size of FWT need for a given received signal format. It should be understood that the flexible FWT circuit 78 might comprise several or many selectable FWT circuits 120, each offering a different size of FWT.

The control logic, including a buffer/switch 122, selectively directing the input data to either transform circuit 120-1 or 120-2 responsive to a selection control signal, which may be thought of as a "mode" signal. The receiver 34 may generate this control signal, or it may be generated elsewhere, such as in the baseband processor 40, or in the system controller 42. In some implementations, the signal processing resources for implementing control logic to support the selectable FWT operation of the RAKE receiver 62 may be implemented in the baseband processor 40, which makes selection control particularly convenient.

Estimation and combining circuits 124 follow each transform circuit 120, but it should be noted that, in some implementations, multiple transform circuits 120 share some or all of the same estimation and combining circuits 124. For example, transform circuits 120-1 and 120-2 may each feed their output data into estimation and combining circuit 124-1. Each of the estimation and combining circuits 120 may include a channel estimator 80, and one or more RAKE combiners 82, as was shown for the exemplary RAKE receiver 62 of FIG. 2.

Figure 8B:
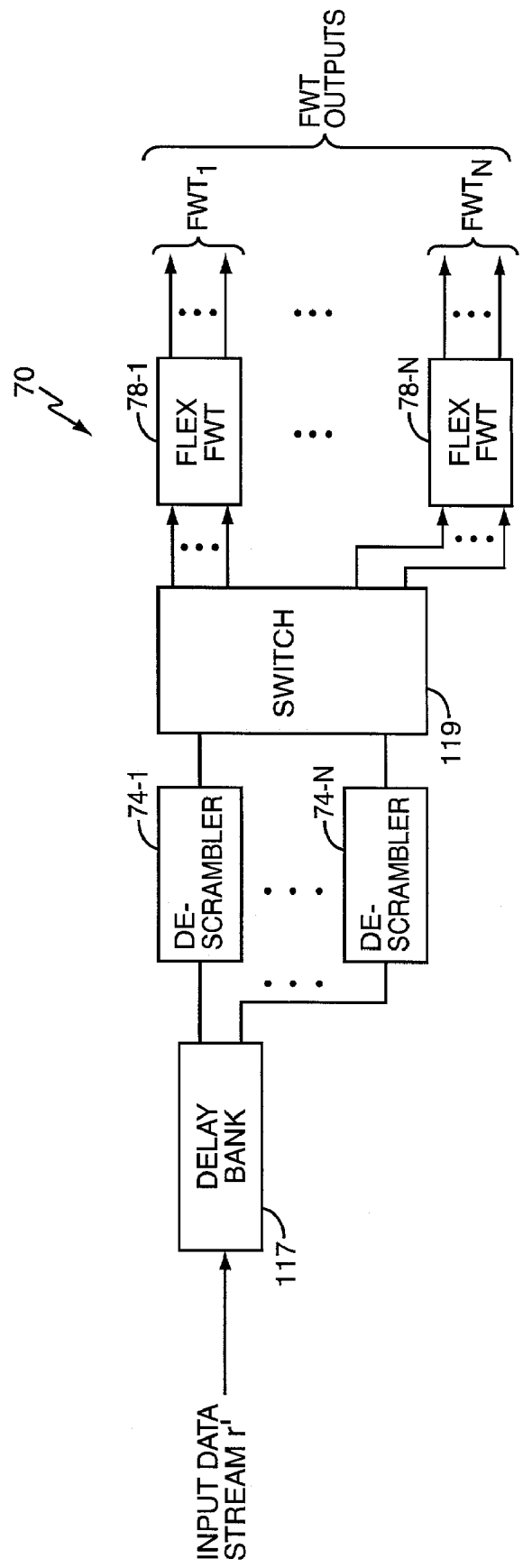

FIG. 8B illustrates an exemplary embodiment of the present invention where a delay bank 117 provides one or more versions of the received signal stream r' at different delays to one or more descramblers 74-1 through 74-N, which feed into a switch 119. In turn, switch 119 converts the descrambled streams into parallel streams and directs the parallel streams into the appropriate one(s) of the flexible transform circuits 78-1 through 78-N, within the RAKE fingers 70 in this embodiment. Thus, the desired Walsh transforms may be performed as needed by operating switch 119 responsive to the control signal discussed earlier. One additional point worth noting is that the circuit of FIG. 8B can be operated such that the effective number of RAKE fingers 70 of RAKE receiver 62 varies under control of switch 119. This capability allows the RAKE receiver 62 to operate with fewer RAKE fingers 70 at larger FWT sizes and more RAKE fingers 70 at smaller FWT sizes.

Figure 9:
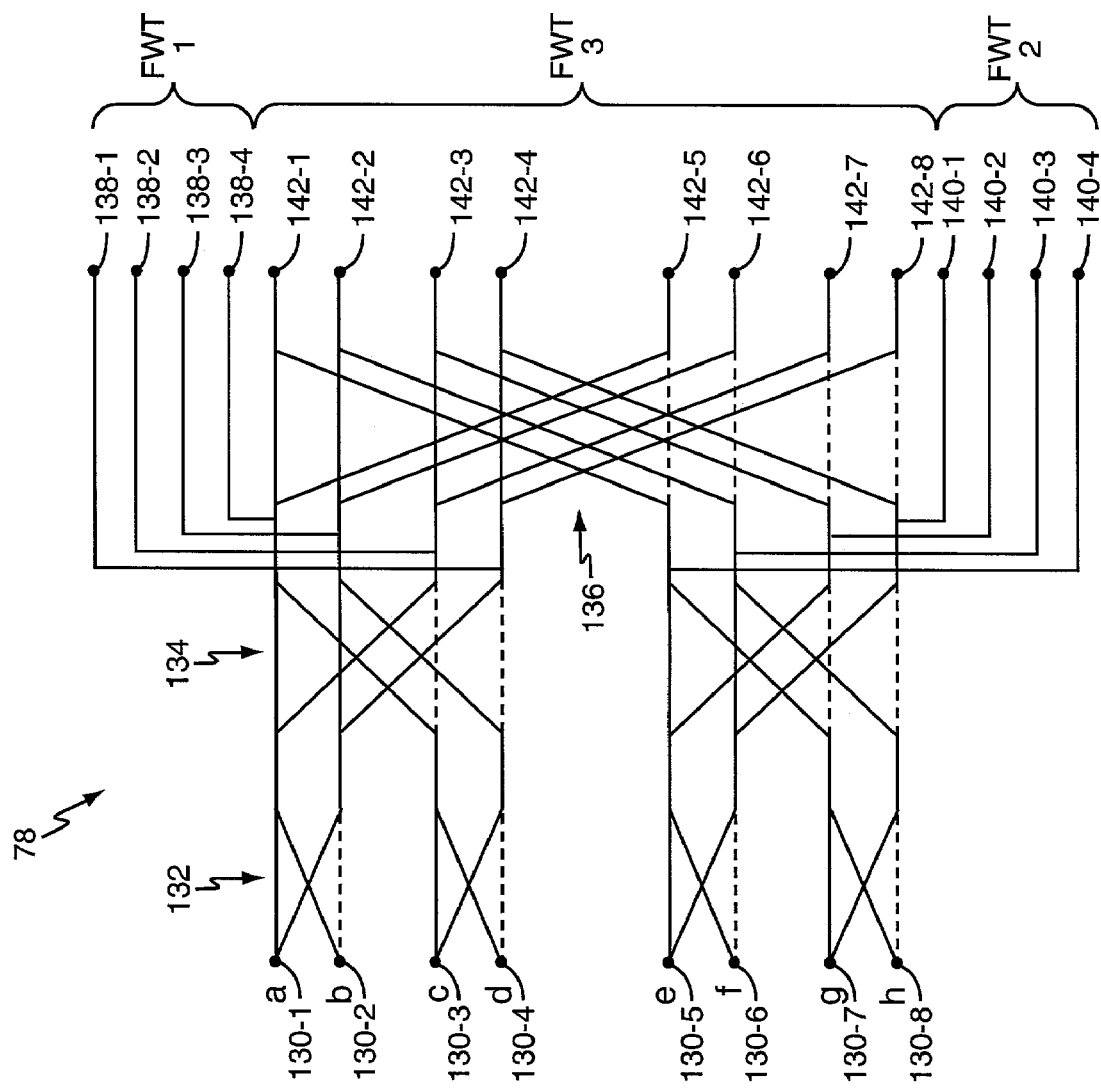
FIG. 9 is a diagram of an exemplary embodiment for the flexible FWT circuit of the present invention.

While implementation of the flexible FWT circuit 78 as a collection of differently sized FWT transform circuits 120 represents a straightforward and effective approach, FIG. 9 illustrates an alternative and arguably more elegant solution. Here, the flexible FWT circuit 78 is configured for a maximum transform size of eight (i.e., 8-point FWT), but it should be understood that other maximum sizes could be used, such as sixteen-point, sixty-four-point, etc. The flexible FWT circuit 78 comprises at set of inputs 130-1 through 130-8, three sets of butterfly circuits 132, 134, and 136, first and second sets of intermediate stage outputs 138-1 through 138-4 and 140-1 through 140-4, respectively, and a set of final stage outputs 142-1 through 142-8.

In an exemplary implementation, the flexible FWT circuit 78 comprises some or all of an integrated circuit (IC) device. For example, the flexible FWT circuit 78 might be implemented as an ASIC or other programmable logic device, e.g., a Field Programmable Gate Array (FPGA). As configured, the flexible FWT circuit 78 offers different sizes of FWT simply by taking output data from the intermediate stage outputs 138 and 140, or from the final stage outputs 142. As with other implementations, a control signal can be used to select the output data set desired, or all outputs might be fed into subsequent processing circuitry and used as needed. In this manner, one circuit device offers dynamically configurable FWT transform operations, thereby simplifying design and saving valuable circuit board space. Other attendant benefits might include reduced power consumption.

One notes from inspection that the results from butterfly circuits 134 feed into the final set of butterfly circuits 136, as well as into the intermediate stage outputs 138 and 140. More particularly, in this arrangement, the first half of butterfly circuits 134 feed into intermediate stage outputs 138, while the second half feed into intermediate stage outputs 140. Thus, four-point FWT results are available on outputs 138 with respect to the first four samples of the input signal, and four-point FWT results are available on outputs 140 with respect to the last four samples of the input signal.

In more detail, the flexible FWT circuit 78 of this embodiment can output one four-point FWT, two four-point FWTs, and one eight-point FWT. This flexibility derives from the availability of intermediate FWT results in advance of the final stage of butterfly circuits 136. That is, the first set of butterfly circuits 132 perform two-point FWTs on the input data, which two-point results are then fed into the second set of butterfly circuits 134. This cascaded set of butterfly circuits 134 performs two-point FWTs on the sum-and-difference results output by butterfly circuits 132, thereby generating four-point FWT results with respect to the original input data. The intermediate four-point FWT results corresponding to the four input samples applied to inputs 130-1 through 130-4 are available on intermediate outputs 138-1 through 138-4. Likewise, the intermediate four-point FWT results corresponding to the four input samples applied to inputs 130-5 through 130-8 are available on intermediate outputs 140-1 through 140-4.

Thus, the input signal may comprise an eight-sample vector {a ... h}, in which case the final-stage outputs 142 provide an eight-point FWT of the input vector. Alternatively, the input signal might comprise a four-sample vector applied either to the first half or last half of inputs 130, with corresponding four-point FWT results available on intermediate stage outputs 138 or 140, respectively. Further, two four-sample vectors may be applied to inputs 130, with two separate four-point FWTs available, one from outputs 138, and the other from outputs 140.

Such flexibility allows the RAKE receiver 62 to dynamically adjust its FWT-based despreading operations in accordance with the desired mode of operation, which may be driven by changing received signal characteristics, e.g., changing spreading factor and/or multicoding parameters. As with the separately implemented transform circuits 120 of FIG. 8A, for example, each set of outputs (i.e., 138, 142, and 140) may feed into its own set of estimation and combining circuits 124, or may share such resources.

Figure 10:
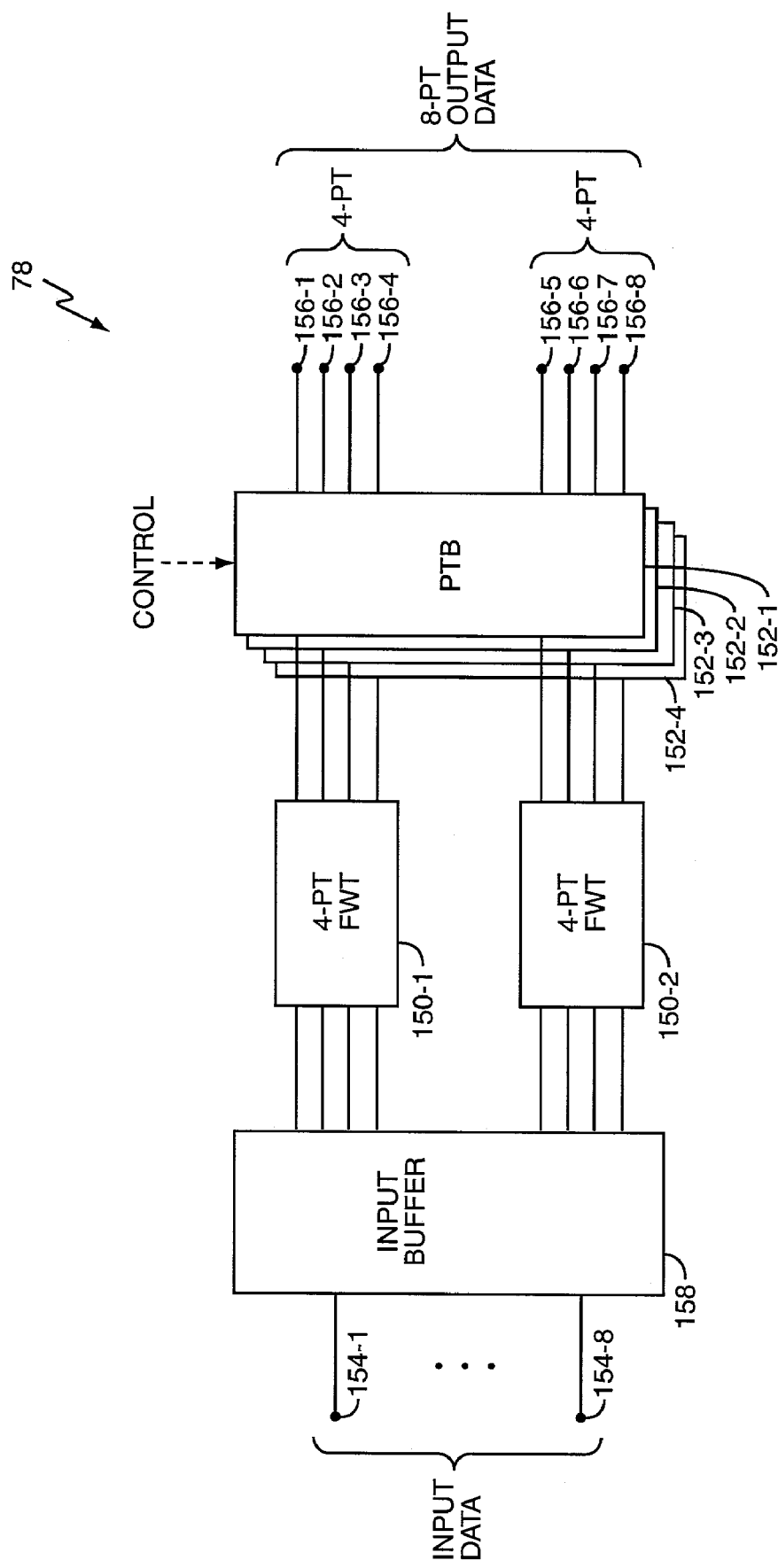
FIG. 10 is a diagram of another exemplary embodiment for the flexible FWT circuit of the present invention.

FIG. 10 shows yet another exemplary embodiment for the flexible FWT circuit 78. Here, the flexible FWT circuit 78 comprises two four-point FWT circuits 150, a set of "pass-through butterflies" (PTBs) 152, a set of inputs 154, a set of outputs 156, and an input buffer 158. Again, this exemplary illustration depicts an arrangement configured for a maximum FWT size of eight, but the structure and operation may be extended to any desired maximum size of FWT.

In operation, the inputs 154 might receive one eight-sample input signal, two four-sample inputs signals, or a single four-sample signal. Thus, input signal stream r' is converted to parallel form and then input to buffer 158. Note that the buffer 158 can provide time alignment or delay functions for the input samples, if needed. For example, the first four inputs 154-1 through 154-4 might receive data during a first symbol time, while the next four inputs 154-5 through 154-8 receive data during a subsequent symbol time. In that case, buffer 158 could delay one or both of the four-sample data sets such that they are processed at the same or different times by the flexible FWT circuit 78.

In any case, controlling the PTBs 152 yields different sizes of FWTs from the flexible FWT circuit 78. Rather than providing intermediate stage outputs as in the embodiment shown in FIG. 9, this implementation controls the PTBs 152 such that they operate either as two-point FWT circuits, i.e., as basic sum-and-difference butterfly circuits, or as simple pass-through circuits. Consequently, the PTBs 152 collectively output eight-point FWT data by performing two-point FWTs on the four-point FWTs output by FWT circuits 150-1 and 150-2, or simply pass through the four-point FWT results from those circuits. Thus, the first and last halves of outputs 156 provide separate four-point FWT results, or together provide one eight-point FWT result. Such operation is suggested in FIGS. 4A and 4B, wherein different PTB modes (i.e., Mode 1 equals butterfly operation, Mode 2 equals pass-through operation) are suggested for different spreading factors of the received signal.

In practice, extending the maximum FWT size available with the above approach simply entails adding additional transform circuits 150 and additional PTBs 152. Thus, to produce a sixteen-point FWT, the flexible FWT circuit 78 is configured with four four-point FWT circuits 150 (i.e., 150-1 through 150-4), with output pairs from each one feeding into a different PTB 152. The outputs of a first stage of PTB processing would feed a second stage of PTB processing. With this arrangement, the FWT outputs would extend from 156-1 through 156-16, and provide up to four individual four-point FWTs, up to two eight-point FWTs, or one sixteen-point FWT, depending upon the selected configuration of PTBs 152. Combinations of different sized FWTs might also be generated by configuring some PTBs 152 for pass-through operation while configuring others for FWT operation. In any case, PTB configuration may be controlled by one or more variations of the control signal discussed earlier.

Figure 11A:
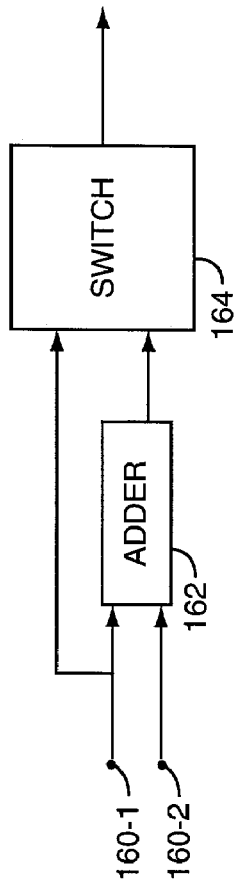
FIGS. 11A and 11B are diagrams of exemplary embodiments for the summing portion of the pass-through butterflies (PTBs) of FIG. 10.
Figure 11B:
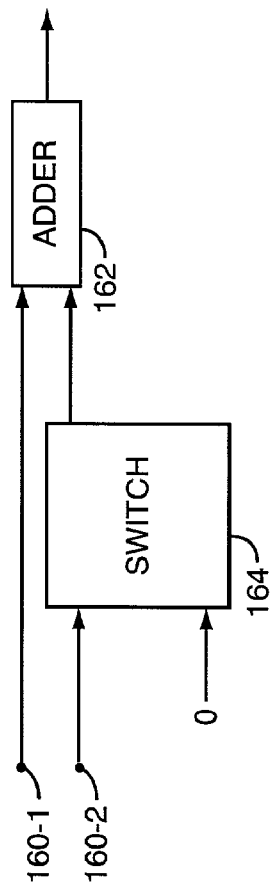

As each PTB 152 provides either signal pass-through or two-point FWT operation, it includes the functional equivalent of the sum-and-difference butterfly circuits introduced earlier. FIGS. 11A and 11B illustrate different embodiments for the summing portion of the needed butterfly circuit.

More particularly, FIG. 11A illustrates one embodiment of the adder portion of an exemplary PTB 152 operating on first and second input signals, e.g., first and second input samples. The adder portion selectively functions as a summing node for the two input signals applied to inputs 160-1 and 160-2, respectively. The first input signal feeds both an adder 162 and a switch 164. The second input signal feeds only the adder 162. The output from the adder is a sum of the first and second input signals, and feeds the switch. Control of the switch 164 thus determines whether the switch outputs the first signal, or a sum of the first and second signals. As noted earlier, the control signal, which may be a multi-bit signal, may be used to control the state of the switch 164.

In FIG. 11B, the summing node takes on an alternate implementation. Here, the switch is fed by the second input signal and a zero or "null" value. The output from the switch 164 feeds into the adder 162, along with the first input signal. Thus, the adder 162 receives the first input signal and, selectively, the second input signal or the null value. As such, the adder outputs the first input signal or the sum of the first and second input signals in dependence on the state of the switch 164.

If implementing PTBs 152 in actual hardware, such as in an FPGA or ASIC, the approach shown in FIG. 11A might offer power savings, because the adder 162 can be powered down or otherwise disabled when the PTB 152 operates in the pass-through mode. Of course, other implementations are available, and FIGS. 11A and 11B illustrate just two of the many approaches to providing selective pass-through and summing operations. Further, one should note that in some embodiments, some or all of the functionality of the flexible FWT circuit 78, including PTBs 152, might be implemented in a DSP. As such, these circuit diagrams are understood to also represent functional depictions of the desired software operations that would be implemented in the instruction code executed by the DSP or other processing system.

Figure 12:
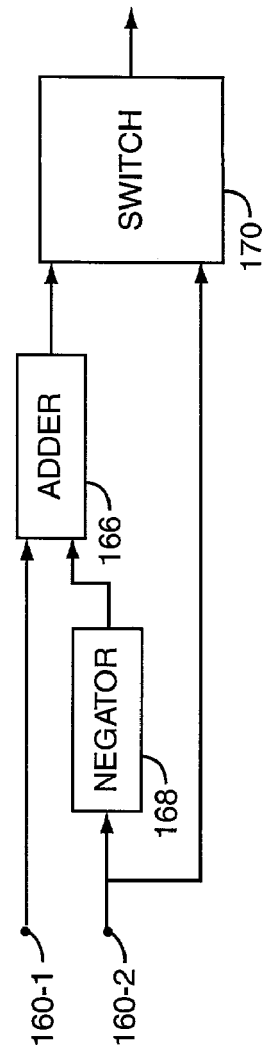
FIG. 12 is a diagram of an exemplary negation circuit for use in the PTBs of FIG. 10.

FIG. 12 shows an exemplary implementation for the differencing node in each PTB 152. Here, the first input signal feed into an adder 166, while the second input signal feeds into a negator 168 and into a switch 170. The output of the negator 168, which is the inverse of the second input signal, feeds into the adder 166. Thus, the output of the adder 166 represents the difference between the first and second input signals, e.g., sample 1 minus sample 2. Switch 170 selectively outputs this difference value, or simply passes through the second input signal.

From FIG. 11A, one sees that switch 164 outputs either the first input signal or the sum of the first and second input signals, and from FIG. 12, sees that switch 170 outputs either the second input signal or the difference between the first and second input signals. By controlling switches 164 and 170, which may be programmable or digitally controllable switches, a given PTB 152 simply passes through its two input signals, or outputs sum-and-difference results for the two input signals.

Regardless of the particular implementation of the flexible FWT circuit 78, its use imbues the RAKE receiver 62 with considerable flexibility in terms of its operation on the received signal r'. For example, where the spreading factor associated with the received signal r' is less than the maximum FWT size available from the flexible FWT circuit 78, the circuit may be used to despread the same received symbol at different delays rather than despreading two symbol periods corresponding to one signal image.

In understanding some of the flexibility imparted to the RAKE receiver 62 by the use of one or more flexible FWT circuits 78, one might consider that, for example, several fingers 70 can, in some embodiments, share FWT resources within a single flexible FWT circuit 78. With this arrangement, the RAKE receiver 62 can dynamically vary the effective "number" of RAKE fingers 70 used in operation. With this approach, more fingers 70 might be used for received signals with lower spreading factors, while a fewer number of fingers 70 might be used when the spreading factor increases.

Figure 13A:
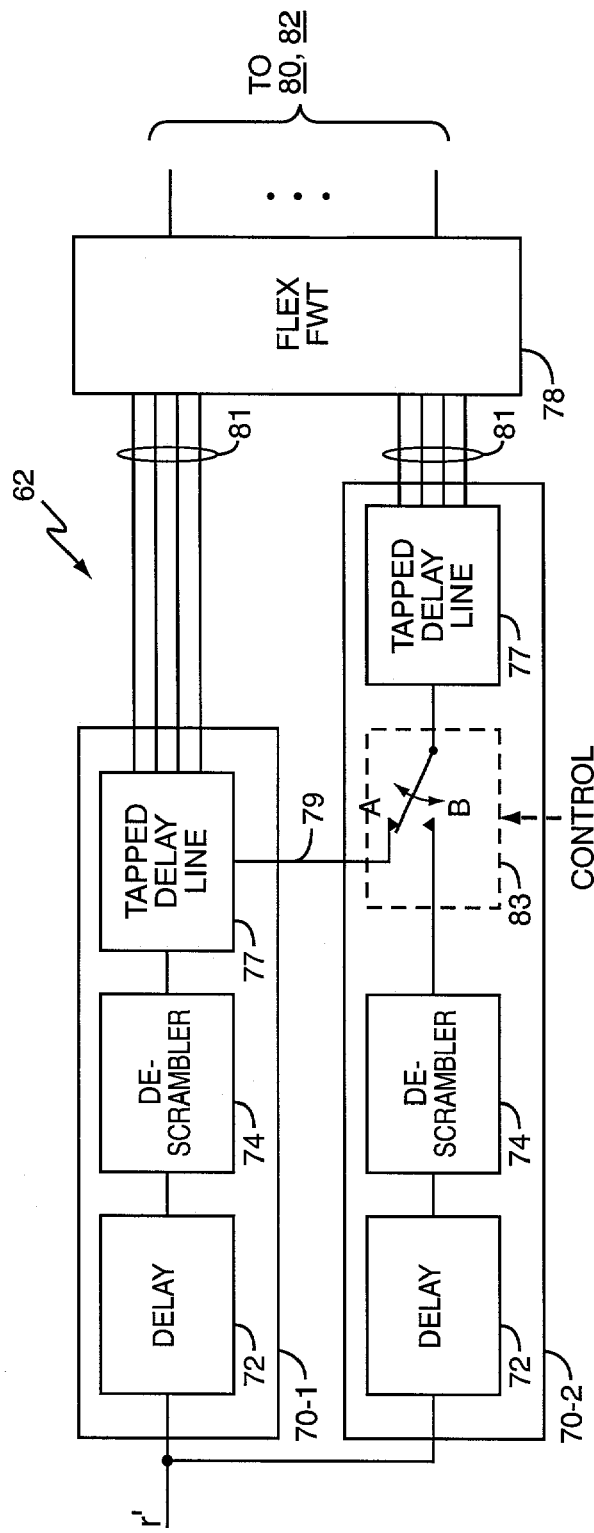

FIG. 13A illustrates another exemplary embodiment capable of implementing the above ideas, and as well as additional operational variations. Here, the flexible RAKE receiver 62 comprises two fingers 70, but it should be understood that the same concept applies directly to a greater number of fingers 70. Each finger 70 comprises a delay block 72, a descrambler 74, and a tapped delay line 77 offering outputs 79 and 81.

While similar to the finger arrangement first introduced in FIG. 2, one sees that each finger 70 feeds into a common flexible FWT circuit 78 that is sized for a desired maximum FWT point size. Additionally, the first finger, finger 70-1, includes a connection between itself and the second finger, finger 70-2, in the form of cross-finger switching. This additional connection derives from the output 79 of the tapped delay line 77 in finger 70-1.

In operation, the tapped delay lines 77 function much like the S/P converters 76 shown in earlier examples. That is, each tapped delay line 77 can convert a serial sample stream input into a parallel set of output samples. Indeed, output 81 on the tapped delay line 77 offers this set of parallel output samples. However, each tapped delay line 77 also offers a serial sample stream on output 79 that follows the input sample stream.

Finger 70-2 is fed this serial sample stream from the tapped delay line 77 of finger 70-1. The serial output from finger 70-1 is selectively applied to the input of the tapped delay line 77 within finger 70-2. That is, a switch 83, which may be a digital switch, functions as part of the FWT control logic and either connects the tapped delay line 77 in finger 70-2 with the sample stream output from the tapped delay line 77 in finger 70-1, or with the serial sample stream from the descrambler 74 in finger 70-2.

Figure 13B:
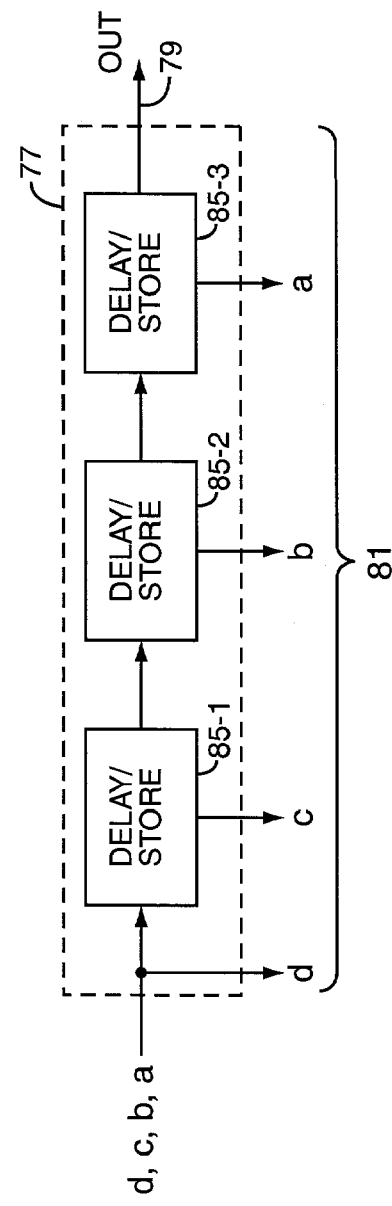
FIG. 13B illustrates an exemplary embodiment for the tapped delay line of FIG. 13A.

FIG. 13B illustrates an exemplary arrangement for the tapped delay lines 77, wherein each offers the outputs 79 and 81 described above, and includes a series of internal delay/store elements 85 that store successive input samples in the incoming sample stream. Thus, if a time-ordered sample sequence {a,b,c,d} is applied to the input of tapped delay line 77, outputs 81 offer the input samples arranged in parallel but available at successive delays, while output 79 offers the same serial sample stream as was presented on the input, but delayed by the cumulative delay represented by delay/storage elements 85.

With the above arrangement, switch 83 may be operated as part of the control logic associated with the flexible FWT circuit 78 by a control signal, which, in some cases, may comprise a simple digital control line from, for example, the baseband processor 40 or the system controller 42. When switch 83 is switched to position "A", the tapped delay line 77 of finger 70-2 is fed from the serial output 79 of the tapped delay line 77 in finger 70-1. When switch 83 is switched to position "B", the tapped delay line 77 of finger 70-2 is fed from the serial output of the de-scrambler 74 in finger 70-2. Thus, changing between switch positions "A" and "B" changes operation of the RAKE receiver 62 from one finger (70-1) performing an eight-point FWT via flexible FWT circuit 78, to two fingers (70-1 and 70-2) performing two four-point FWTs via flexible FWT circuit 78.

In general, the flexible FWT circuit 78 enables significant signal processing flexibility. For example, the FWT circuit 78 can be used to produce partial correlations instead of full correlations. As an illustration of this in the context of FIG. 9, assuming the spreading factor is 8, the outputs 138 and 140 provide partial correlations, correlating to length 4 subsequences of the length 8 Walsh codes. The partial correlations may be used, for example, in join demodulation, as described in U.S. Pat. No. 5,506,861 to Bottomley.

The number of codes used to send data or pilot information may be less than the spreading factor. For example, with spreading factor 16, the user may be given only 11 codes with data, with a 12th code for the pilot signal. In this situation, a 16-point FWT is needed, but only 12 of the outputs are used. In this scenario, four of the outputs from the flexible FWT circuit 78 simply can be ignored. Alternatively, to save power for example, certain butterfly operations in the final stage(s) of the flexible FWT circuit 78 can be turned off or otherwise disabled, so that the unused FWT outputs and the logic associated with forming the corresponding difference terms are held inactive.

From the above discussion, the adaptability of use and range of applications for the flexible FWT circuit 78 should be readily apparent to those skilled in the art. That is, the present invention enables a radio receiver to flexibly accommodate a variety of spreading factors for multi-code received signals. Further, the present invention enables, in some encoding/spreading factor scenarios, the use of partial correlations. While described in conjunction with RAKE reception, the despreading operations provided by the flexible FWT circuit 78 can be used in other receivers, such as multi-user detection receivers, generalized RAKE receivers, and chip equalization receivers. Also, the flexible FWT circuit 78 can be used to decode Reed-Muller codes. As such, the present invention is not limited by the exemplary embodiments disclosed in the foregoing discussion and in the associated illustrations, but rather is limited only by the scope of the following claims, and the reasonable equivalents thereof.

What is claimed is:

1. A RAKE receiver for use in a wireless communication device, the RAKE receiver comprising:
   a flexible Fast Walsh Transform (FWT) circuit to despread a received signal received by the wireless communication device, the flexible FWT circuit performing different sizes of FWTs responsive to a selection control signal;
   a first number of RAKE fingers selectively coupled to the flexible FWT circuit; and
   control logic to configure the flexible FWT circuit in accordance with one or more parameters of the received signal such that the RAKE receiver varies a number of active fingers from among the first number of RAKE fingers based on a spreading factor of the received signal.

2. The RAKE receiver of claim 1, wherein the RAKE receiver determines a spreading factor associated with the received signal, and wherein the control logic configures the flexible FWT circuit based on the spreading factor.

3. The RAKE receiver of claim 1, wherein the control logic selects a second number of the RAKE fingers, said second number no greater than the first number, such that the RAKE receiver effectively operates with a variable number of RAKE fingers responsive to the control logic.

4. The RAKE receiver of claim 1, further comprising a number of RAKE fingers, and wherein the flexible FWT circuit comprises a variable-size FWT circuit for each RAKE finger.

5. The RAKE receiver of claim 1, wherein the flexible FWT circuit comprises a FWT transform output that includes one or more sets of intermediate stage outputs providing intermediate transform results, and further includes a set of final stage outputs providing final transform results.

6. The RAKE receiver of claim 5, wherein the flexible FWT circuit comprises an n-point final output stage and at least one (n/2)-point intermediate output stage.

7. The RAKE receiver of claim 5, wherein the flexible FWT circuit comprises an n-point final output stage and at least one (n/4)-point intermediate output stage.

8. The RAKE receiver of claim 5, wherein the flexible FWT circuit comprises an eight-point FWT final output stage, and two four-point FWT intermediate output stages.

9. The RAKE receiver of claim 1, wherein the flexible FWT comprises at least one n-point first transform stage followed by a in-point pass-through butterfly stage, which pass-through butterfly stage selectively operates as a in-point FWT transform circuit or a pass-through circuit responsive to the control logic.

10. The RAKE receiver of claim 1, wherein the RAKE receivers uses the flexible FWT circuit to perform partial correlations between two or more samples of the received signal representing part of an information symbol.

11. A despreading circuit for use in a radio receiver to perform despreading operations on a received signal subject to Walsh Code spreading, the circuit comprising:
   a RAKE receiver comprising a plurality of RAKE fingers;
   a plurality of flexible Fast Walsh Transform (FWT) circuits, each disposed in one of the RAKE fingers and comprising a variable-size FWT circuit operative to perform at least two differently sized FWTs on samples obtained from the received signal, each variable-size FWT circuit comprising:
      an intermediate FWT stage with an associated set of intermediate result outputs providing a first size of FWT; and
      a final FWT stage with an associated set of final result outputs providing a second size of FWT; and
   control logic to configure the flexible FWT circuits to perform a desired FWT size based on one or more parameters of the received signal.

12. The despreading circuit of claim 11, wherein the control logic comprises processing logic within a processor that determines the one or more parameters of the received signal.

13. The despreading circuit of claim 12, wherein the control logic further comprises control logic responsive to one or more control signals from the processor, wherein the control logic configures the flexible FWT circuits to obtain the desired size of FWT results.

14. The despreading circuit of claim 11, wherein the control logic configures the flexible FWT circuits based on a spreading factor of the received signal.

15. The despreading circuit of claim 11, wherein the control logic determines whether FWT results for the flexible FWT circuits are taken from the intermediate result outputs or from the final stage outputs.

16. The despreading circuit of claim 11, wherein the final FWT stage provides results for an n-point FWT, and further wherein the intermediate FWT stage is one of a plurality of m intermediate stages, each intermediate stage performing an (n/m)-point FWT.

17. The despreading circuit of claim 11, wherein the flexible FWT circuits comprise:
   a first FWT circuit to provide first results by performing a first FWT of a first point size; and
   one or more pass-through butterfly circuits to selectively pass through the first results or perform FWTs of a second size on the first results to provide second results of a second point size.

18. The despreading circuit of claim 11, wherein the flexible FWT circuits are connected to selected ones of the RAKE fingers by operation of the control logic.

19. The despreading circuit of claim 18, wherein the control logic controls the RAKE receiver such that it operates with a variable number of active RAKE fingers responsive to the one or more parameters of the received signal.

20. The despreading circuit of claim 19, wherein the RAKE receiver varies the number of active RAKE fingers inversely with a desired size of FWT for the received signal.

21. The despreading circuit of claim 18, wherein the control logic includes cross-finger switching between two of the plurality of RAKE fingers such that the two RAKE fingers provide parallel samples of the received signal to the flexible FWT circuits in a first switch configuration, and a second one of the two RAKE fingers provides delayed samples from a first one of the two fingers to the flexible FWT circuits in a second switch configuration.

22. The despreading circuit of claim 21, wherein the flexible FWT circuits perform an n-point FWT in the first switch configuration, and perform an (n/m) m-point FWTs in the second switch configuration.

23. The circuit of claim 11, wherein the one or more parameters of the received signal include a number of spreading factors associated with the received signal, and wherein the control logic configures the flexible FWT circuits for two or more desired sizes of FWTs based on the number of spreading codes.

24. The circuit of claim 11, wherein the despreading circuit performs partial correlations between samples of the received signal corresponding to part of a symbol time.

25. A method of despreading a received signal spread using Walsh Code spreading, the method comprising:
  receiving a signal at a RAKE receiver comprising a plurality of RAKE fingers;
  determining a spreading factor used to spread the received signal;
  configuring one or more flexible Fast Walsh Transform (FWT) circuits for a desired FWT point size depending on the spreading factor by selecting a desired number of active RAKE fingers and selecting a desired corresponding FWT size for each active RAKE finger based on the spreading factor; and
  despreading samples obtained from the received signal using one or more of the flexible FWT circuits configured for the desired FWT point size.

26. The method of claim 25, wherein each of the a plurality of RAKE fingers comprises one of the flexible FWT circuits that includes at least one set of intermediate result outputs representing a FWT of a first size, and at least one set of final result outputs representing a FWT of a second size, and wherein configuring the one or more of the flexible Fast Walsh Transform (FWT) circuits for a desired FWT point size depending on the spreading factor further comprises selecting either the set of intermediate results or the set of final results based on the desired FWT point size.

27. The method of claim 25, further comprising despreading samples representing different delays of a common symbol time of the received signal.

28. The method of claim 27, further comprising despreading samples representing different symbol times.

* * * * *